Nov. 26, 1935.  J. C. WOODFORD  2,022,631
FLUID METER
Original Filed May 22, 1934
FIG. I.
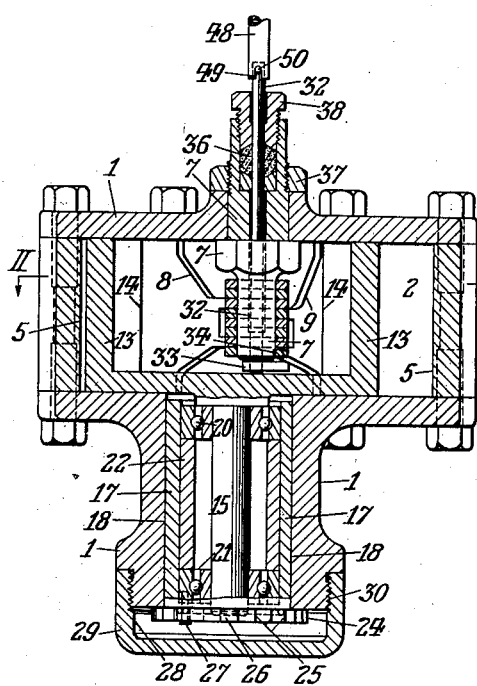
FIG. II.
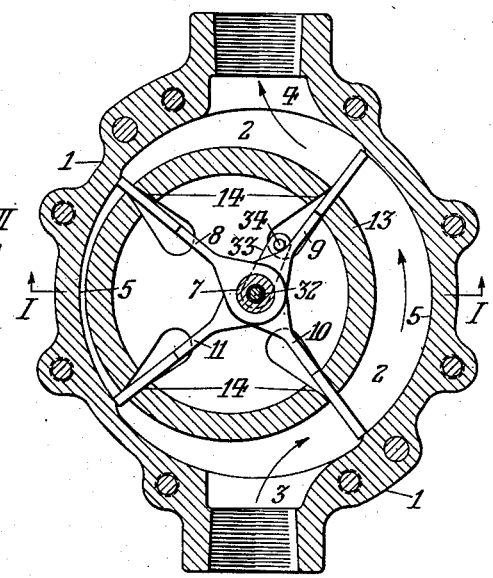
FIG. III.
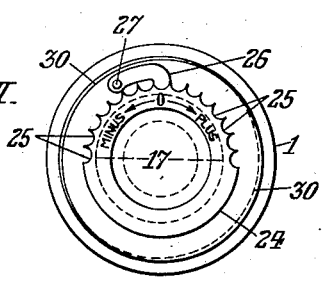
INVENTOR:
JOSEPH C. WOODFORD,
BY
Attorney.

Patented Nov. 26, 1935

2,022,631

UNITED STATES PATENT OFFICE 2,022,631

FLUID METER

Joseph C. Woodford, Haverford, Pa., assignor to Service Station Equipment Company, Conshohocken, Pa., a corporation of Delaware Original application May 22, 1934, Serial No. 726,923. Divided and this application February 25, 1935, Serial No. 7,933

3 Claims. (Cl. 73—37)

This in a division of my application Serial No. 726,923 filed May 22, 1934, for Letters Patent of the United States for Improvement in fluid meters and relates particularly to the means for adjusting the position of the rotor of the meter to vary the fluid space between said rotor and the casing in which it rotates to thereby variably predetermine the volume of fluid passed through the meter casing at each revolution of the rotor.

I have designated my invention an improvement in meters because it may be conveniently utilized in the construction of a meter operated by the flow of liquid in any liquid dispensing apparatus, for instance, in dispensation of lubricating oil or gasolene or other fuel oil. However, the essential features of my invention may not only be utilized in such a meter, operable by the flow of any fluid therethrough, but may be utilized in the construction of a displacement meter which is in effect a pump for impelling the flow of liquid in a liquid dispensing apparatus or other apparatus.

The form of my invention hereinafter described includes a casing inclosing a fluid chamber having a fluid inlet and a fluid outlet on diametrically opposite sides thereof; said chamber having a cylindrical inner wall in coaxial relation with a stationary stud shaft upon which four similar blades are mounted for independent rotation with their outer ends in close relation with said cylindrical wall. A cylindrical cup-shaped rotor having a series of four equally circumferentially spaced slots in its rim is fitted over said shaft and blades in said chamber with the blades extending through the respective slots in the rotor; said rotor having a shaft in coaxial relation therewith journaled in said casing in eccentric relation with said shaft upon which the blades turn so that said rotor has its perimeter in close proximity to one side of said cylindrical wall of the chamber and in spaced relation with the opposite side of said chamber, and liquid passing through said chamber from said inlet to said outlet pushes upon the blades projecting in the space between said cylindrical wall and rotor and turns the latter. There is more or less leakage of fluid between the inlet and outlet depending upon the viscosity of the fluid and the fit of the blades with respect to the chamber wall and rotor. Therefore, I provide means for varying the eccentricity of the axis of said rotor with respect to the common axis of rotation of said blades so as to precisely determine the volume of fluid passed through said chamber with each revolution of the rotor. Such means include an eccentric bearing sleeve for said rotor shaft, which sleeve is rotatably adjustable in said casing. Said sleeve has a series of notches in a sector on a circumferential flange presented in a compartment at the end of said casing normally closed by a screw cap. A pawl pivoted upon said casing within said compartment may be selectively engaged with any one of said notches in accordance with the position of rotary adjustment of said sleeve, but may only be disengaged when said cap is removed. Consequently, the means for effecting variation in the volume of fluid dispensed through said chamber with each revolution of the rotor is normally secluded and concealed by said screw cap so as to prevent unauthorized tampering with said meter.

My invention includes the various novel features of construction and arrangement hereinafter more definitely specified.

In said drawing, Fig. I is a plan sectional view of a meter embodying my invention, taken on the diametrical line I, I in Fig. II.

Fig. II is a vertical sectional view of said structure shown in Fig. I, taken on the line II, II in that figure.

Fig. III is an elevation of the lower end of the casing shown in Fig. I with the cap removed, showing the means for adjustably varying the eccentricity of the rotor with respect to the axis of rotation of the blades.

Referring to said figures; the casing 1 incloses the fluid chamber 2 having the fluid inlet 3 and the fluid outlet 4 on diametrically opposite sides thereof. Said chamber has the cylindrical inner wall 5 in coaxial relation with the stationary stud shaft 7 upon which four similar blades 8, 9, 10, and 11 are mounted for independent rotation with their outer ends in close relation with said cylindrical wall 5. The cylindrical cup-shaped rotor 13 has a series of four equally circumferentially spaced slots 14 in its rim, and is fitted over said shaft 7 and blades in said chamber 2 with the blades extending through the respective slots in said rotor. Said rotor has the shaft 15 in coaxial relation therewith, journaled in said casing 1 in eccentric relation with said shaft 7, upon which said blades turn, so that said rotor has its perimeter in close proximity to one side of said cylindrical wall 5 of the chamber and in spaced relation with the opposite side of said chamber. The construction and arrangement are such that fluid passing through said chamber from said inlet to said outlet pushes upon the blades projecting in the space between the chamber wall 5 and said rotor 13 and turns the latter.

There is more or less leakage of fluid through said casing 1 from the inlet 3 to the outlet 4, depending upon the viscosity of the fluid and the fit of the blades with respect to said chamber wall 5 and rotor 13. Therefore, I provide means for varying the eccentricity of the axis of said rotor 13 with respect to the common axis of rotation of said blades 8, 9, 10, and 11, so as to vary the space between said chamber wall 5 and rotor 13 to precisely determine the volume of fluid passed through said chamber with each revolution of the rotor. Such means include the eccentric bearing sleeve 17 which is journaled in the cylindrical bore 18 in said casing 1 and carries the ball bearings 20 and 21 for said shaft 15; said bearings being held in properly spaced relation in said sleeve 17 by the cylindrical tubular bushing 22 in said sleeve, as shown in Fig. I. As best shown in Fig. III, said sleeve 17 has at its outer end the annular flange 24 with a circumferential series of notches 25 therein adapted to be selectively engaged by the keeper pawl 26 which is fulcrumed upon the stationary stud 27 which is fixed in said casing 1.

As indicated in Fig. III, said pawl is engaged with the notch 25 intermediate of the length of the series of notches and designated by zero. Adjustment of said sleeve clockwise in Fig. III, as indicated by the arrow and the word "Plus", increases the amount of fluid passed through the casing 1 during each revolution of the rotor. Adjustment of said sleeve counterclockwise, as indicated by the arrow and the word "Minus" in Fig. III, decreases the amount of fluid passed through the casing during each revolution of the rotor. Said pawl 26 is prevented from accidental displacement from its adjusted position by contact with the inner wall 28 of the removable cap 29, which wall is indicated by the dotted line in coaxial relation with said casing 1 in Fig. III. As indicated in Fig. I, said cap 29 is normally engaged with said casing 1 by the screw thread 30. It must be removed to permit outward movement of said pawl 26 upon its fulcrum stud 27 to effect any rotary adjustment of said sleeve 17.

Said stationary shaft 7 for the rotary blades is hollow and forms a bearing for the inner end of the crank shaft 32 which extends coaxially therethrough and is provided with the crank 33 at its inner end having the crank pin 34 in contact with the blade 9, as shown in Fig. II, so as to be turned by rotation of said blade in the direction of the arrow indicated in that figure. Said crank shaft 32 extends through the stuffing box 36 which is conveniently formed in the outer end of said shaft 7 which is rigidly connected with said casing 1 by the nut 37, and said shaft is journaled in the adjustable gland 38 of said stuffing box.

Said crank shaft 32 may be utilized to operate any suitable device for indicating the volume of fluid passed through said casing 1. The indicating mechanism may be connected to the tubular shaft 48 which has the notch 49 in its opposite end for engagement with the cross pin 50 on the shaft 32.

However, I do not desire to limit myself to the precise details of construction and arrangement herein set forth, as it is obvious that various modifications may be made therein without departing from the essential features of my invention, as defined in the appended claims.

I claim:

1. The combination with a casing inclosing a fluid chamber having a fluid inlet and a fluid outlet and a cylindriform inner wall; a rotor comprising a cylindriform body and a shaft in coaxial relation; means supporting said rotor in said chamber in eccentric relation with said casing wall, so that diametrically opposite sides of said rotor are respectively in close relation with said wall and in spaced relation therewith; a plurality of blades connected with said rotor and having their outer ends in close relation with said casing wall; means for varying the spaced relation of said rotor with respect to said wall and thereby variably predetermining the volumes of fluid trapped between said casing wall, blades, and rotor; and means for maintaining said rotor in such adjusted relation including an eccentric bearing sleeve for said rotor shaft having a circumferentially extending series of notches, and a pawl pivoted on said casing for selectively engaging a notch in said series and thereby securing said sleeve in adjusted position; and a cap removably fitted upon said casing, normally covering said notched portion of the sleeve and said pawl and preventing movement of the latter; whereby it is necessary to remove said cap to adjust said sleeve.

2. The combination with a casing; of an eccentric bearing sleeve journaled in said casing having a circumferentially extending series of notches; a pawl pivoted on said casing adapted to be selectively engaged in any notch of said series to secure said sleeve in adjusted position; and a shaft journaled in said sleeve; whereby the position of the axis of said shaft in said casing may be variably determined by adjustment of said sleeve and pawl; and a cap removably fitted upon said casing, normally covering said notched portion of the sleeve and said pawl and preventing movement of the latter; whereby it is necessary to remove said cap to adjust said sleeve.

3. The combination with a casing; of an eccentric bearing sleeve journaled in said casing having a circumferentially extending series of notches; a pawl pivoted on said casing adapted to be selectively engaged in any notch of said series to secure said sleeve in adjusted position; a shaft journaled in said sleeve; whereby the position of the axis of said shaft in said casing may be variably determined by adjustment of said sleeve and pawl; and a screw cap removably fitted upon said casing normally covering said notched portion of the sleeve and said pawl and preventing movement of the latter, said cap being smoothly continuous with respect to the exterior portion of the casing with which it is engaged; whereby it is necessary to remove said cap to adjust said sleeve; and the pawl and notches in said sleeve constituting means for adjusting the latter are normally secluded and concealed and unauthorized adjustment of said shaft thereby prevented.

JOSEPH C. WOODFORD.